(12) United States Patent
Altfeder et al.

(10) Patent No.: US 9,087,288 B2
(45) Date of Patent: Jul. 21, 2015

(54) METHOD OF GENERATING VOID PANTOGRAPHS

(71) Applicant: Troy Group, Inc., Costa Mesa, CA (US)

(72) Inventors: David Altfeder, Aberdeen, NC (US); Jason Zimpelmann, Fayetteville, NC (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 13/851,302

(22) Filed: Mar. 27, 2013

(65) Prior Publication Data
US 2014/0293357 A1    Oct. 2, 2014

(51) Int. Cl.
  *H04N 1/405*   (2006.01)
  *G06K 15/02*   (2006.01)
  *B41M 3/14*    (2006.01)
  *H04N 1/00*    (2006.01)

(52) U.S. Cl.
  CPC ............. *G06K 15/1867* (2013.01); *B41M 3/14* (2013.01); *H04N 1/00846* (2013.01); *H04N 1/00867* (2013.01); *H04N 1/00883* (2013.01)

(58) Field of Classification Search
  CPC .......... H04N 1/32203; H04N 1/00883; H04N 1/32219; H04N 1/32261; H04N 2201/0082; H04N 2201/327; H04N 1/32144; H04N 1/32208; H04N 1/32235; H04N 1/32256; H04N 1/32288; H04N 1/32299; H04N 1/32229; H04N 1/32293; H04N 1/32309; G06T 2201/0051; G06T 1/0028; G06T 1/005; B41M 3/10

USPC .......... 358/1.9, 2.1, 3.28, 3.2, 3.1–3.13, 1.15, 358/1.1
See application file for complete search history.

(56) References Cited

U.S. PATENT DOCUMENTS

| | | | |
|---|---|---|---|
| 7,580,155 | B2 | 8/2009 | McElvain |
| 2011/0310404 | A1 | 12/2011 | Simske et al. |
| 2011/0310441 | A1 | 12/2011 | Simske et al. |

FOREIGN PATENT DOCUMENTS

| | | |
|---|---|---|
| WO | 2010/098760 | 9/2010 |
| WO | 2011/129912 | 10/2011 |

OTHER PUBLICATIONS

Jason S. Aronoff et al. "Automated Optimization of Void Pantograph Settings", Oct. 6, 2011; 5 pages.
Steven J. Simske et al. "Variable Data Void Pantographs", Oct. 6, 2011; 5 pages.
Extended European Search Report, European Application No. 13190169.6, Feb. 17, 2014, 6 pages.

*Primary Examiner* — Thomas D Lee
*Assistant Examiner* — Stephen M Brinich

(57) ABSTRACT

A method of generating a large number of different void pantographs quickly and easily enables selecting a void pantograph that works best with a particular copy machine make and model. The background patterns are generated by varying the size of the dots and placement of the dots on an X-Y grid. The foreground pattern is generated by varying the size of the dots and placement of the dots on an X-Y grid. The foreground and background patterns may be generated by combining two separate patterns. A foreground pattern is combined with multiple background patterns to produce the different void pantographs. A full page of void pantographs having a similar density is tested on a copy machine to determine which one works the best.

20 Claims, 12 Drawing Sheets

Page 1, Darkness 2

Page 1, Darkness 2

METHOD OF GENERATING VOID PANTOGRAPHS

BACKGROUND OF THE INVENTION

1. Field of the Invention

The present invention relates to void pantographs and more particularly, pertains to a method of generating a very large number of different void pantographs.

2. Description of Related Art

Void pantographs (VPs) have been an important part of the security printing industry for quite a while. Void pantographs are traditionally designed for use with a specific printing technology, such as flexo, gravure, offset or screen printing, for example. The designing of VPs for the mobile printing world of today, which involves electro photographic printing methods presents an almost insurmountable problem because of the great variety of printing machines. The present invention provides a method of generating a large, almost limitless, number of different void pantographs, quickly and easily, which can be tested on the printer and copier combination of interest, allowing selection of a VP that works best for that combination.

SUMMARY OF THE INVENTION

A large number of different void pantographs are generated for testing with a particular make and model of machine in order to select the void pantograph that works best with a particular make and model machine. The foreground dot patterns are generated by varying the dot size, and dot placement in an x-y grid. The background dot patterns are generated by varying the dot size and dot placement on an x-y grid. By using different combinations of two different dot patterns to generate the foreground patterns and two different dot patterns to generate the background patterns, the number of different pantographs that can be generated is almost limitless.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
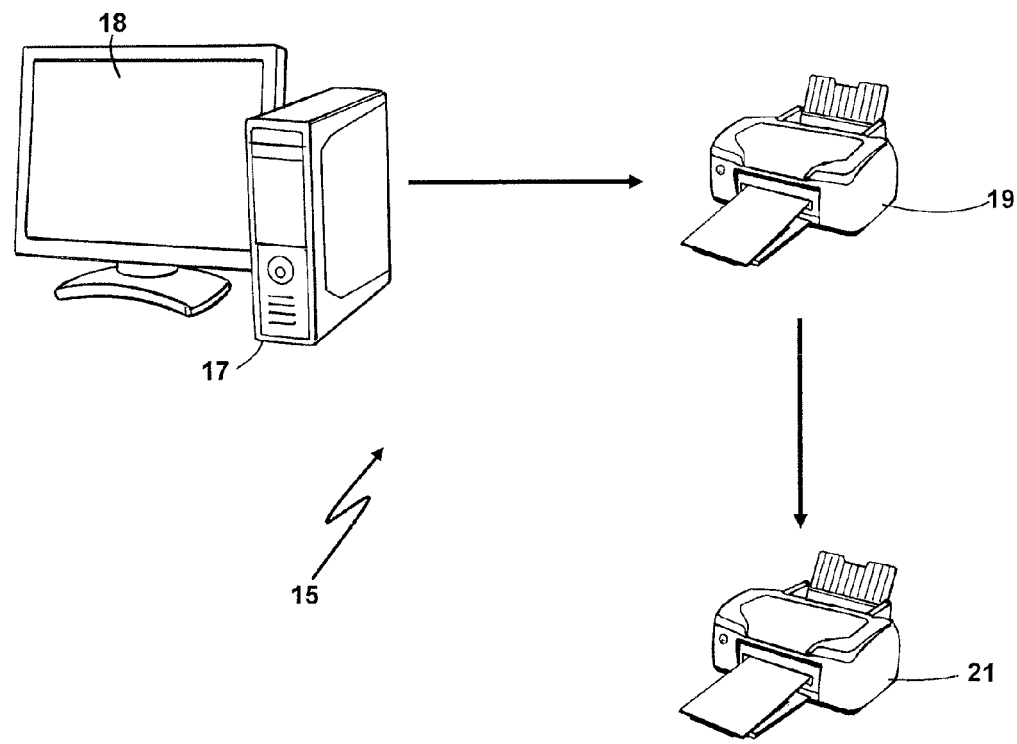
FIG. 1 is a pictorial illustration of a computer printing system utilizing the present invention.

A system 15 having a computer 17, a visual display 18, a printer 19 and a scanner/copier 21 communicating with the processor 17, as illustrated in FIG. 1, is a system that can be used to generate void pantographs.

Figure 2:
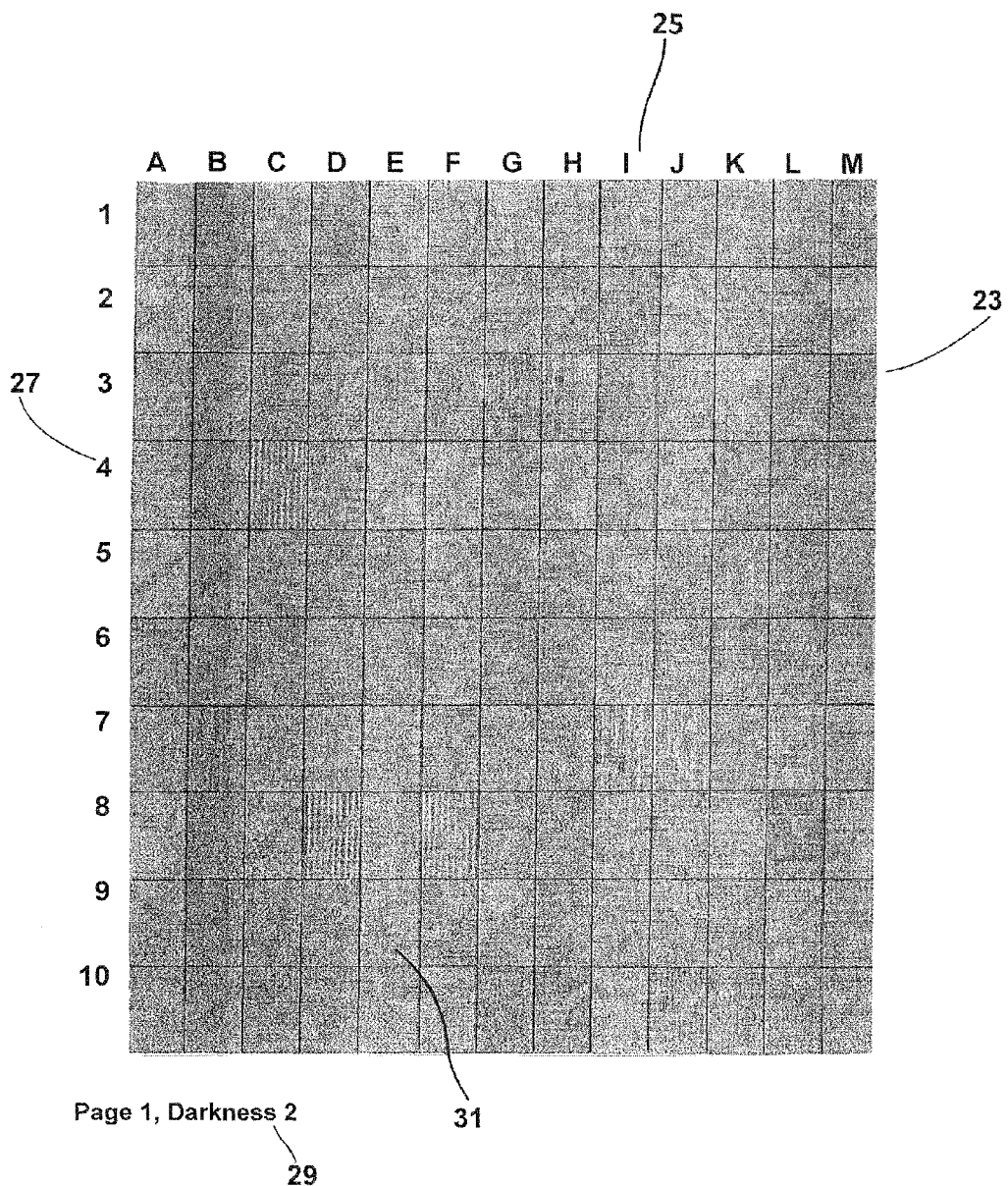
FIG. 2 is a graphic illustration of a plurality of pantographs generated by the system of FIG. 1.

FIG. 2 is a graphical representation 23 of 130 cells. Each cell contains a different void pantograph generated according to the present invention. The sheet 23 of 130 different void pantographs is divided into 130 cells. One void pantograph occupies each cell. Each cell is identified according to the number of its row 27 and the letter of its column 25. Thus, for example, cell 31 would be identified as cell E9 in test sheet 23. Test sheet 23 is generated by the processor 17 and printed by printer 19, for example. Printer 19 actually prints the void pantograph test sheet 23.

Figure 10:
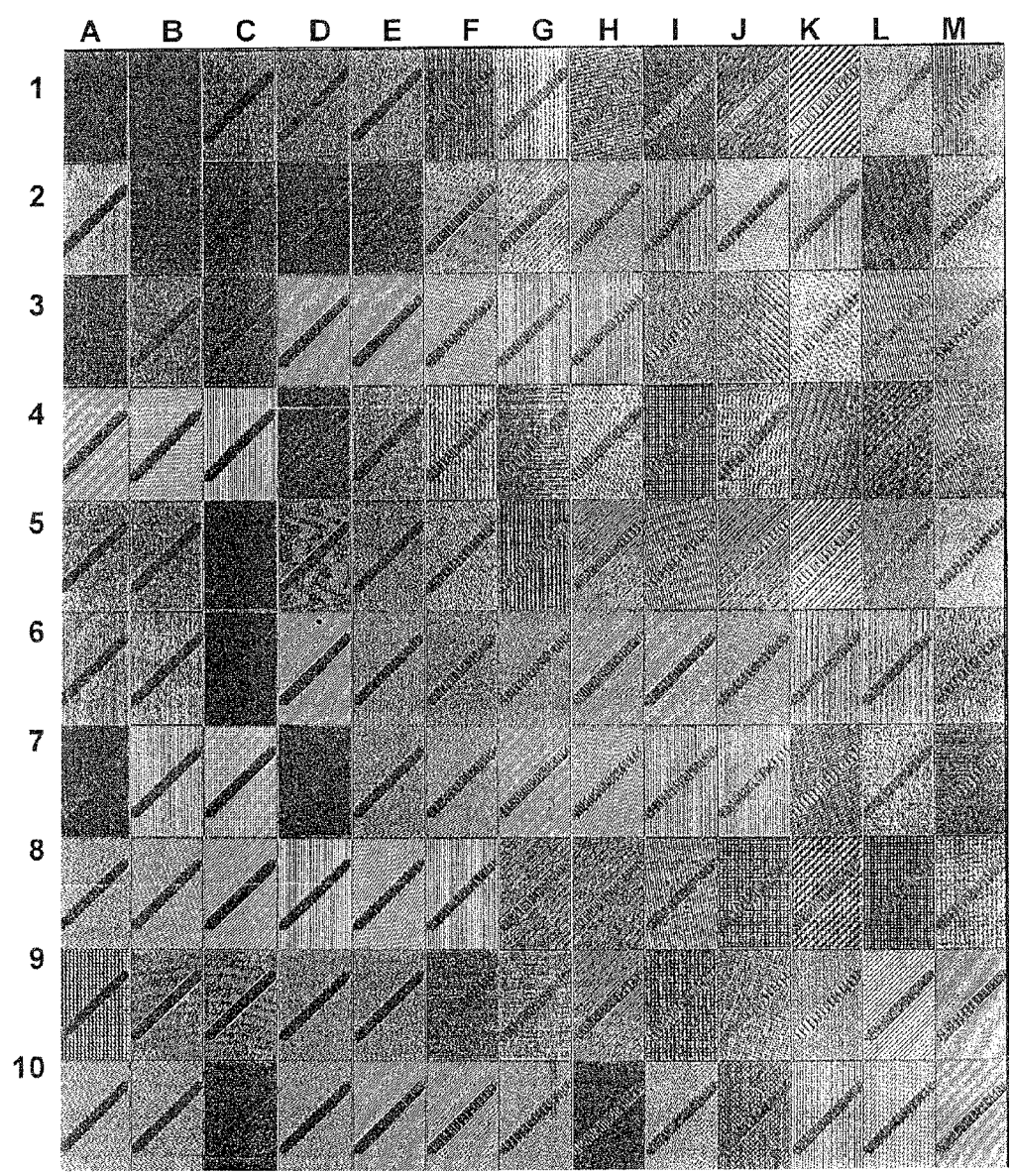
FIG. 10 is a graphical representation of the multiple void pantographs of FIG. 9 after being copied.

After printing the void pantograph test sheet 23 of 130 cells, for the example, a specific pantograph 31 is identified on the sheet which appears to best hide the "copy" or other void message. In the example of FIG. 2, the hidden void image is a bold slash extending from top right to bottom left of the cell. This slash is visually apparent in many of the cells on test sheet 23. To determine if pantograph E9 in cell 31 of the test sheet 23 will function adequately in a scanner/copier 21, test sheet 23 is copied by copier 21. FIG. 10 is a copy of printed test sheet 23. Pantograph E9 on test sheet 23 causes a bold slash from the upper right to the lower left to appear when copied.

For specific printers and copiers, pantograph E9 appears to be a good choice. This is not the case in most instances for many of the different other printer models currently on the market.

Each void pantograph, such as the void pantograph in cell 31, consists of a foreground pattern of pixels or dots and a background pattern of pixels or dots. The characters that make up "copy" text, for example, in a pantograph are printed using the foreground pattern. The background pattern is used simply to print background on a page and hide the foreground text. The combination of the foreground and background patterns hide the characters for the "copy" text so they are not visible on a printed page when the two patterns visually blend. The characters "copy" will become visible only when the printed page is copied. FIG. 10 for example, shows a slash from upper right to lower left of a cell after being copied. The slash was not visible in the printed void pantograph with the foreground and background visually blended. The example of a void slash could also be a void "copy."

Because different printer models and copier models produce variations in dot patterns, adjustments are required for almost each printer model to come up with a pantograph pattern that works best with that specific printer, copier combination.

This requires a large pool of different pantographs. Both the foreground pattern, which is used to generate the "copy" characters and the background pattern within which the "copy" characters are hidden, utilize a constant dot size to produce the patterns. Dot size is one parameter that is varied in order to generate different void pantographs.

Figure 3:
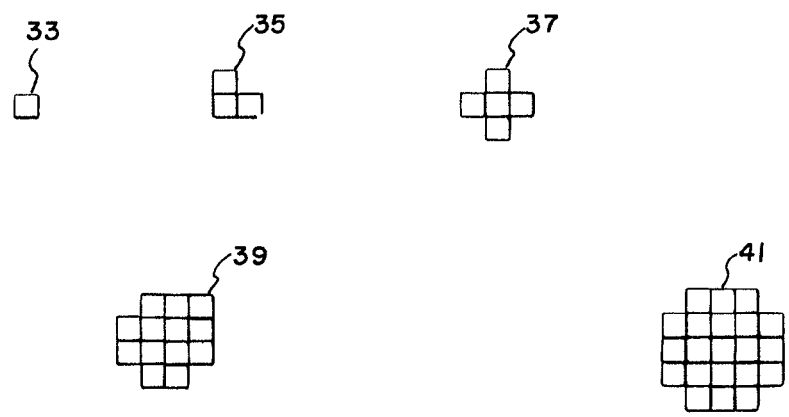
FIG. 3 is a graphical depiction of various dot configurations and sizes utilized in the present invention.

FIG. 3 illustrates various dot sizes that are contemplated for use in the present invention. Dot 33 is a single pixel. Dot 35 is two pixels. Dot 37 is three pixels. Dot 39 is four pixels. Dot 41 is a five pixel dot. The size of the dot is one variable in generating a variety of void pantographs. The spacing of the dots on a grid is another variable used to generate a variety of void pantographs. The dot size and dot spacing variables generate certain foreground and background dot patterns that are combined to form void pantographs.

Figure 4:
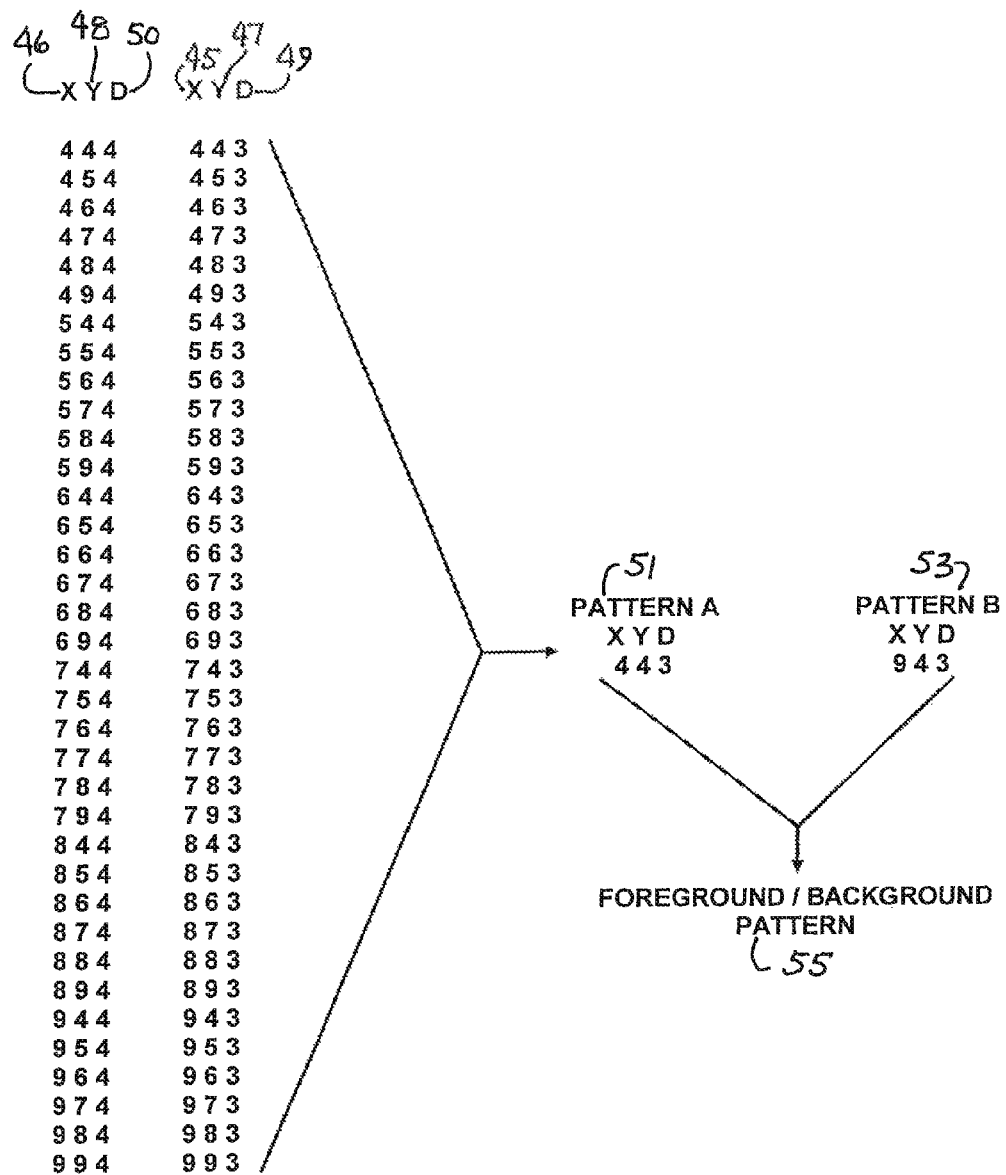
FIG. 4 is a graphical representation of the foreground and background patterns and their possible combinations, utilized to generate the void pantographs.

FIG. 4 graphically illustrates in a narrow subset, to preserve simplicity, a multitude of pattern combinations available for the generation of void pantographs. In one example, the first column 46 illustrates X values. The second column 48 illustrates Y values. The third column 50 illustrates dot size. In a second example, the first column 45 illustrates X values. The second column 47 illustrates Y values. The third column 49, illustrates dot size. The first example illustrates a small subset of patterns available for a four pixel dot with different densities as determined by the placement of the dots on the X and Y axis. For the first example, the first line shows X, Y and D values of 4, 4, and 4. This indicates a pattern using a four pixel dot size with the dots placed four spaces apart on the X axis and four spaces apart on the Y axis.

The second example illustrates a subset of patterns 43 which has a dot size of three pixels. For purposes of illustration, a foreground and background pattern are chosen from this second subset. Pattern 4, 4, 3 is selected for pattern A, 51 as the foreground pattern. Pattern 9, 4, 3 is selected for pattern B, 53 as the background pattern. The use of these two patterns together produce a void pantograph 55.

Figure 5:
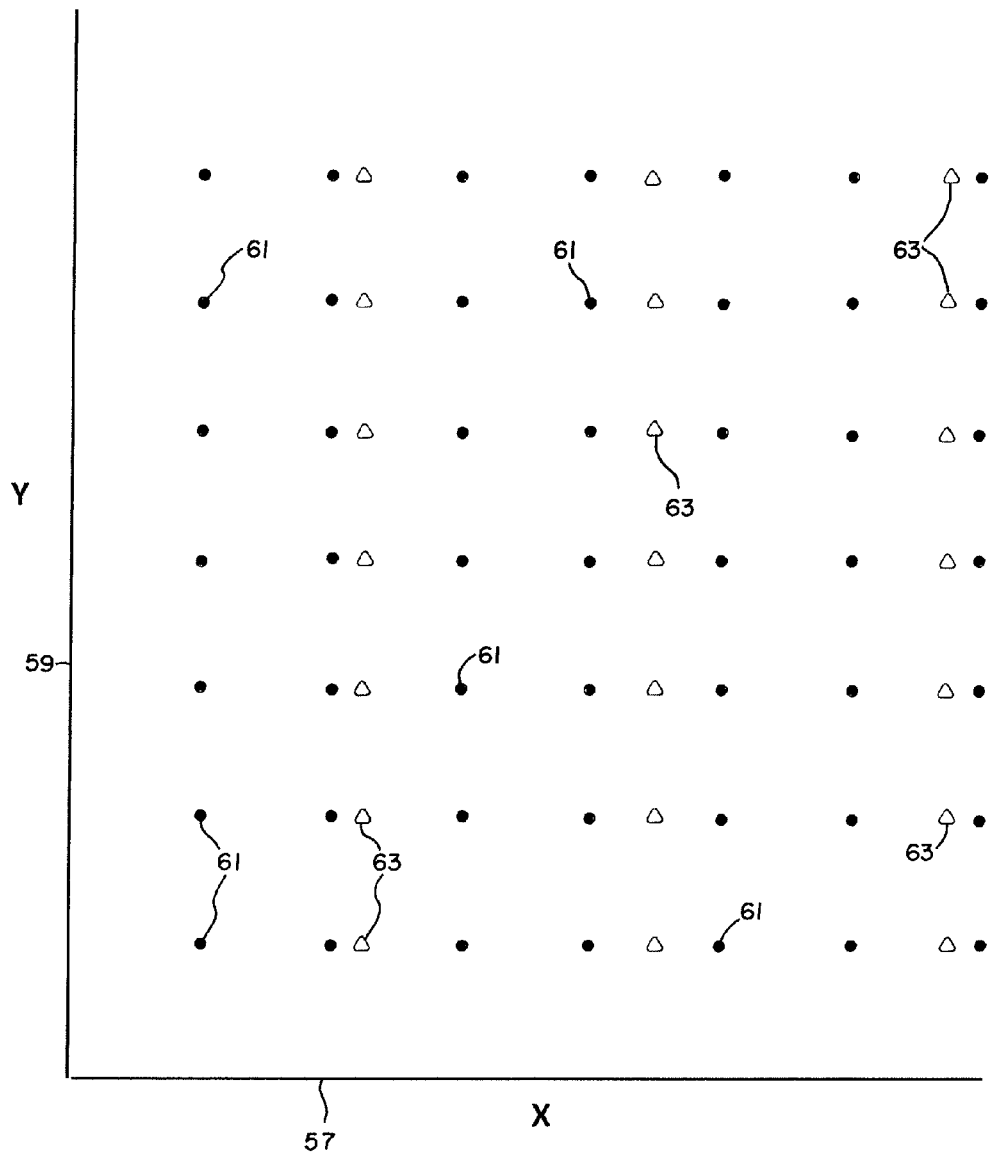
FIG. 5 is a graphical representation of one of the foreground/background pattern combinations of FIG. 4.

The placement of these dots on an X, Y coordinate grid is shown in FIG. 5. Axis 57 is the X axis. Axis 59 is the Y axis. The A pattern is the pattern represented by the round dots 61. The B pattern is the pattern represented by the triangular dots 63. The round dot pattern 61 is considered the foreground pattern, in this example. This pattern would be used to generate the "copy" characters. The triangular dot pattern 63 is the background pattern, used to hide the "copy" characters when the background and foreground are combined to generate the void pantograph which is printed on a document.

In order to increase the number of void pantographs available, the present invention contemplates the use of two patterns blended to generate a foreground pattern, and two patterns blended to generate a background pattern. For example, the pattern illustrated in FIG. 4, pattern A51 and pattern B53 could be combined together and used as the foreground pattern of a void pantograph. An alternate combination of pattern A and pattern B would then be needed to form the background pattern of the void pantograph. As can be seen, this increases the number of void pantograph variations available exponentially. For the example of FIG. 2, showing 130 different pantographs, this merging of two different patterns makes 16,900 pantographs available.

Figure 6:
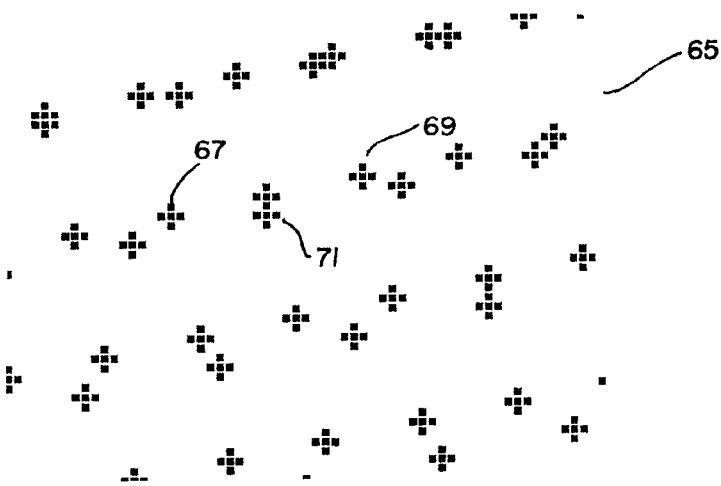
FIG. 6 is a graphical representation of an alternate foreground/background pattern selection.

FIG. 6 is an illustration of merging two different patterns to form a foreground or background pattern. The double pattern 65 utilizes a three pixel dot with both patterns evenly but differently spaced. This means that the X and Y values are the same within each pattern. The combining of the two patterns creates a double pattern where some of the dots, like dot 67, are separate, some of the dots, like 71, partially overlap, and some of the dots, like dot 69 are closely spaced with other dots.

Figure 7:
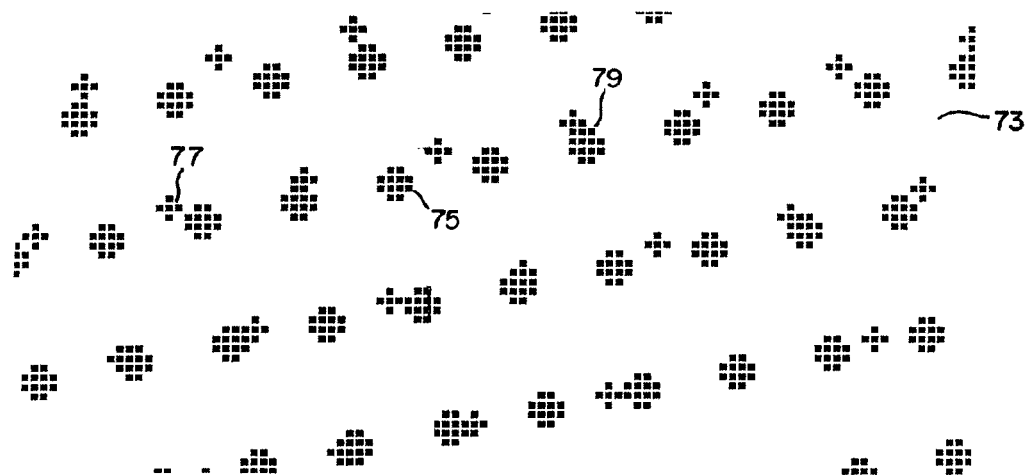
FIG. 7 is a representation of another foreground/background pattern selection.

FIG. 7 illustrates a different combination of two patterns. Here, each pattern has a different dot size. The dot sizes used are dot size 3 and dot size 4. The dots in each pattern are evenly but differently spaced. The combination creates a double pattern 73, where some of the dots, like dot 75 are separate, some of the dots, like dot 79 overlap, and some of the dots, like dot 77, are close together.

The dot patterns 65 and 73, of FIGS. 6 and 7, could be used either as foreground or background patterns to generate a void pantograph. As a starting point for generating a void pantograph, it is contemplated that, a background pattern is selected. The background is kept static while the foreground pattern is varied to generate a variety of pantographs, until a suitable void pantograph is found. Starting with a static foreground pattern and varying the background pattern is equally viable.

Based on experimentation, the inventors have determined that a good starting point for a background pattern is a first pattern with an X-Y spacing of 4, 4 combined with a second pattern having an X-Y spacing of 9, 4. This is the double pattern illustrated in FIG. 5.

Figure 8A:
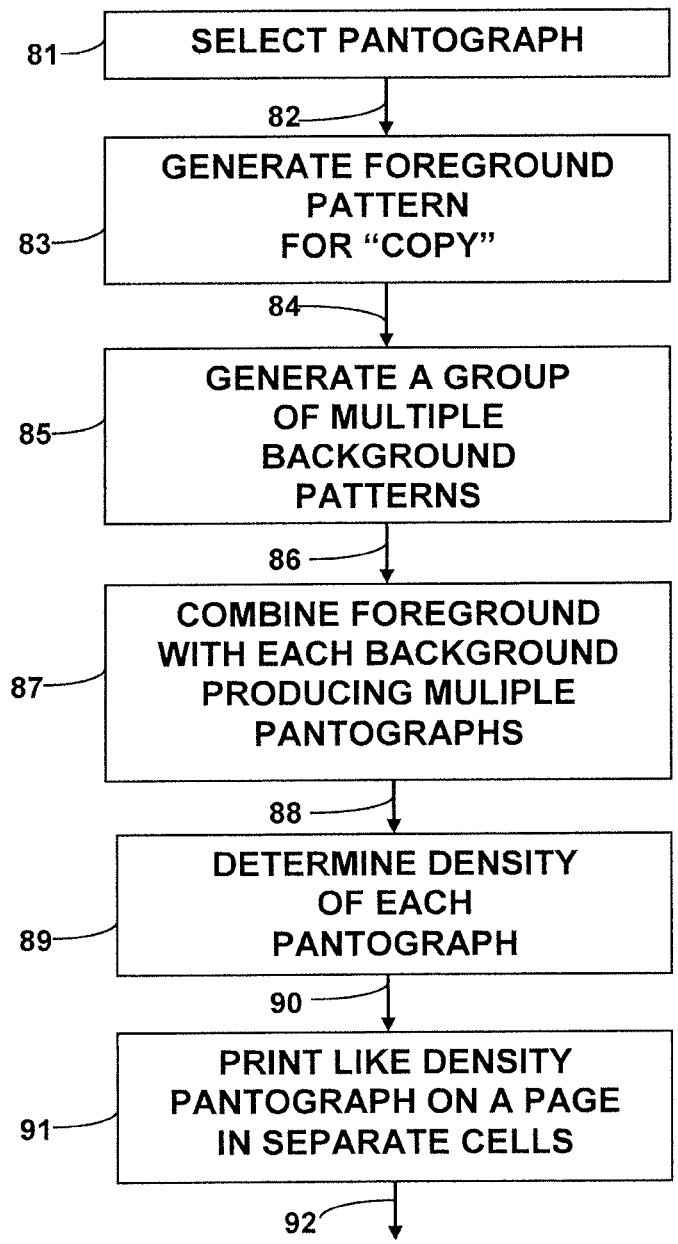
FIGS. 8A and 8B is a flowchart representing the process by which a pantograph is generated for a specific printer.
Figure 8B:
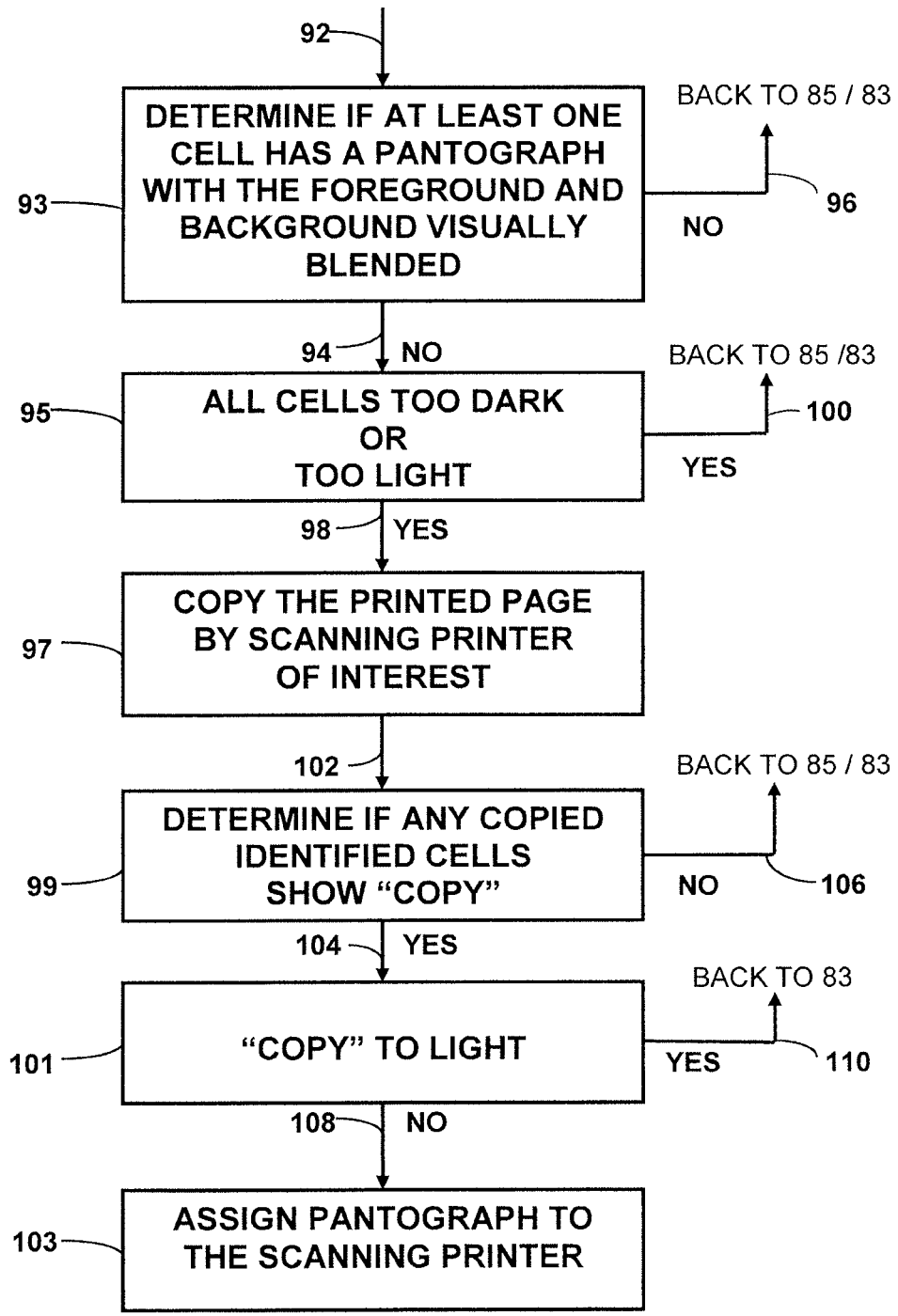

Referring now to FIGS. 8A and 8B, a preferred method of generating a void pantograph, according to the present invention, is illustrated. The first step 81 is to select a pantograph message, like "void," "copy" "X, or "/." The pantograph message is then sent 82 to be filled with a starting foreground pattern. A foreground pattern 83 is generated and used to fill the pantograph message. Preferably, the foreground pattern is a combination of two different patterns. For example, Pattern A and pattern B, illustrated in FIG. 4, merged together to form a single foreground pattern, illustrated in FIG. 5.

Upon generation of the foreground pattern, multiple background patterns 85 are then produced. These multiple background patterns are also preferably combinations of two of the many subsets of pattern A and pattern B merged together to produce the larger variety of background patterns. The generated foreground pattern and the variety of background patterns are merged 86, to produce a plurality of void pantographs. Before printing the different void pantographs, the void pantographs are classified according to density 89. In other words, lighter pantographs are grouped together, as are darker pantographs. The pantograph cells are printed 90 after being grouped according to like density. The pantographs of similar density 91 are printed to produce a sheet containing a plurality of different void pantographs in separate cells.

The illustration in FIG. 2 shows 130 different void pantographs in 130 individual pantograph cells. All 130 pantographs have a similar density. This test collection of pantograph cells is printed 92 on a sheet of paper by a printer of interest. The printed void pantographs are visually inspected 93 to determine which void pantograph cell has the best visual blending of the foreground pantograph message and the background pattern.

If a desirable void pantograph is not found 96, the process goes back to step 83. With the foreground pattern kept constant, the foreground pattern generated at step 83 is combined with a whole new series of background patterns generated at step 85. In the alternative, rather than changing the background patterns 85, the foreground pattern could be changed at step 83 and combined with the previously generated background pattern. In this manner, an unlimited variety of void pantographs can be generated.

If a void pantograph cell is found at step 93 that acceptably visually blends foreground and background patterns, that cell 94 is evaluated to determine if the pattern is too dark or too light. If the pattern is too dark or too light 100, the process goes back to step 85/83 wherein a new combination of foreground pattern and background patterns generate another test sheet of void pantographs, as shown in FIGS. 2 and 9.

If an acceptable void pantograph cell is found 98, the entire sheet of void pantograph cells is provided to a scanning copier 97, which copies the printed page. The copy of the printed page is examined 102 to determine if the previously selected void pantograph cell shows the "copy" foreground 99, which was previously hidden.

If the copy provides a clear "copy" pantograph message 99, it is determined 104 whether the "copy" message is too light 101. If it should be darker, the process goes back to step 83 to choose a new foreground pattern. If the "copy" is determined not too light 108, it is assigned to the scanning printer of interest.

Figure 9:
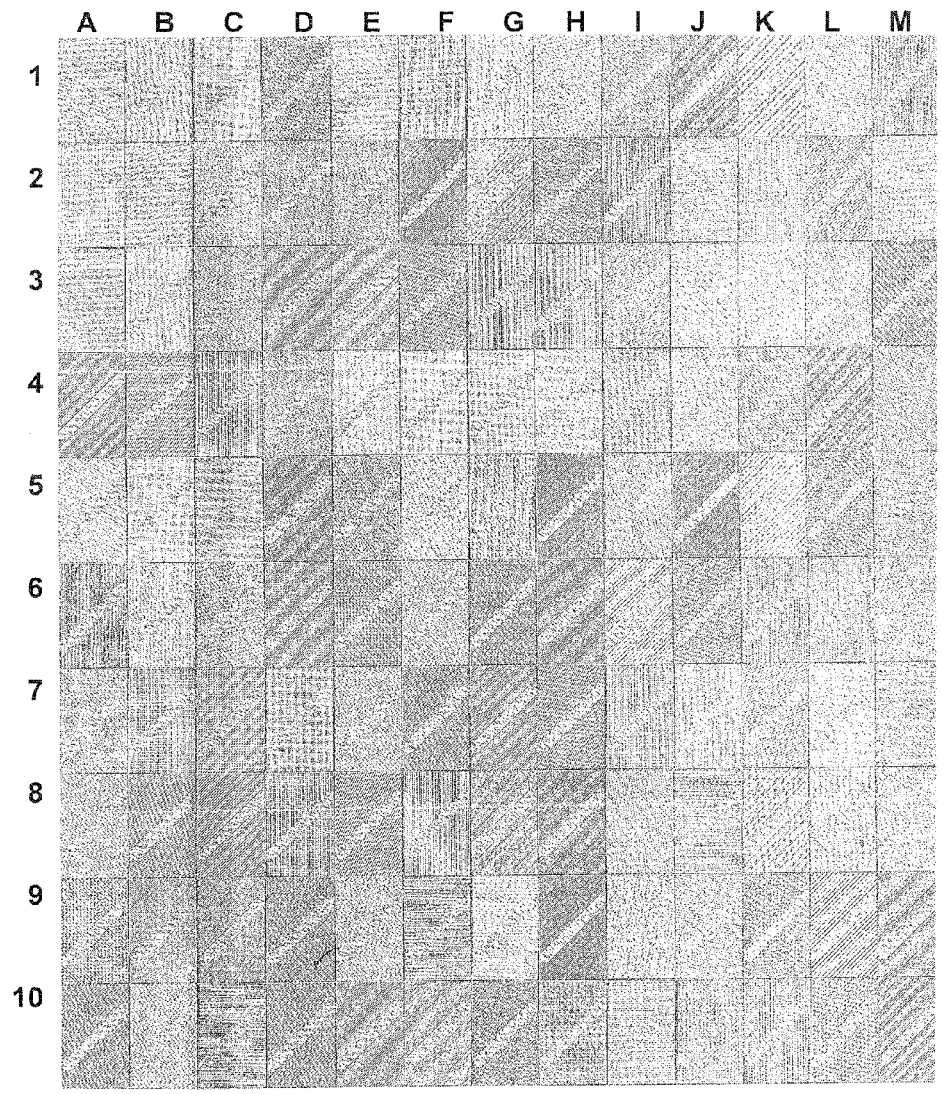
FIG. 9 is a graphical representation of a sheet of multiple void pantographs, generated for testing.

An example of this process is shown in FIGS. 9-12. FIG. 9 shows a page of printed void pantograph cells, created by the process of the present invention, as showing an appropriate or sufficient blending of the background and foreground patterns. The foreground pattern, in the form of a stripe going from upper right to lower left is sufficiently blended.

FIG. 10 illustrates the page of void pantographs of FIG. 9 copied by a scanning copier, which causes the foreground pattern stripe to show up. With respect to the selected void pantograph cell D9 (FIGS. 9 and 10), the stripe appears to be quite distinctive after copying. Not too light, and therefore, acceptable. The void pantograph D9 would then be assigned to the scanning printer that copied the printed void pantograph cells of FIG. 9.

Figure 11:
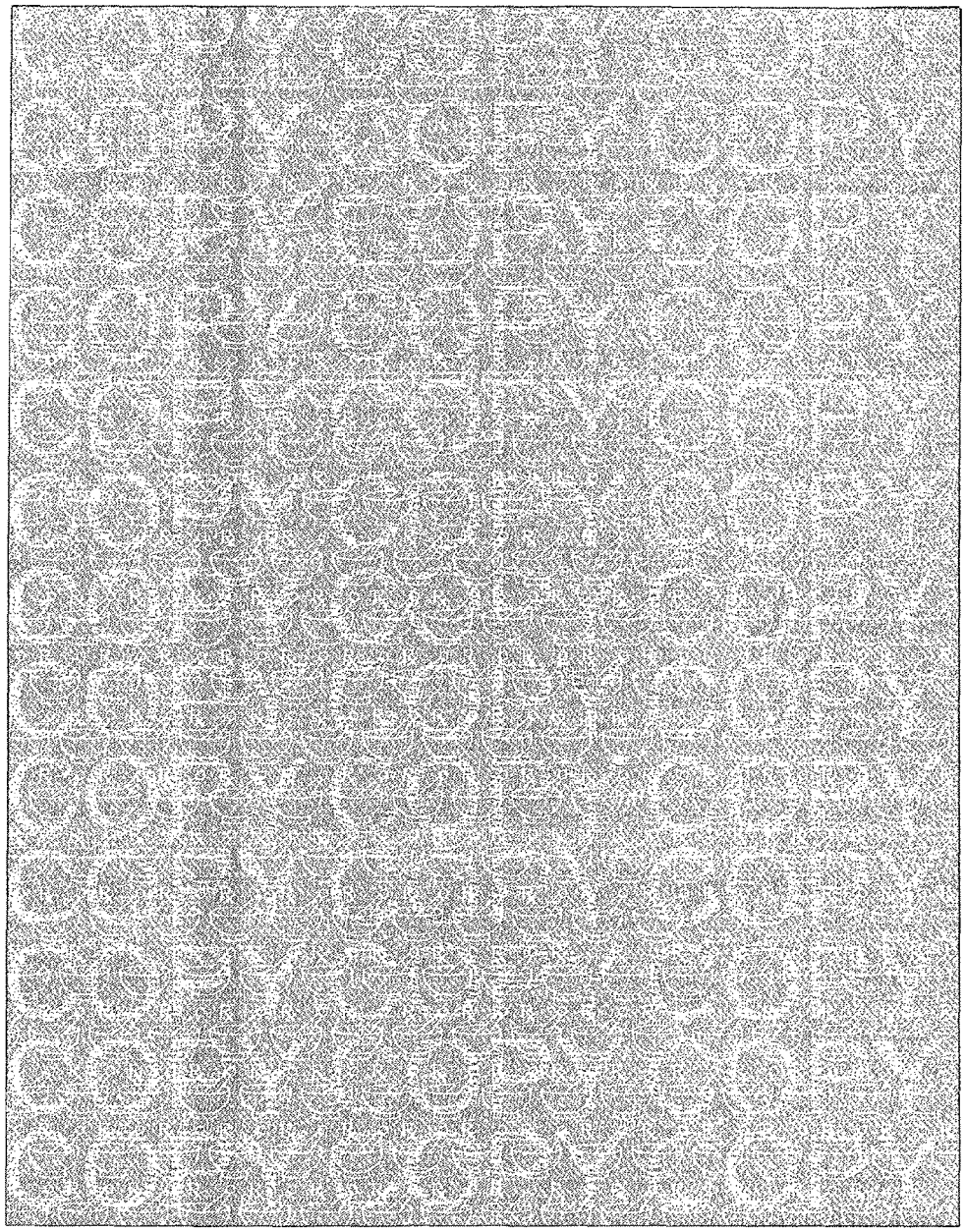
FIG. 11 is a graphical representation of a void pantograph selected for a particular machine with an interference pattern.

FIG. 11 illustrates the use of an overlay interference pattern, which happens to be a mortar and pestle design, used predominately for prescription paper. This pattern is overlaid onto a selected void pantograph. As can be seen from FIG. 11, no pantograph message is apparent. Any differences between the foreground and background pattern of the void pantograph are successfully masked by the overlay interference pattern.

Figure 12:
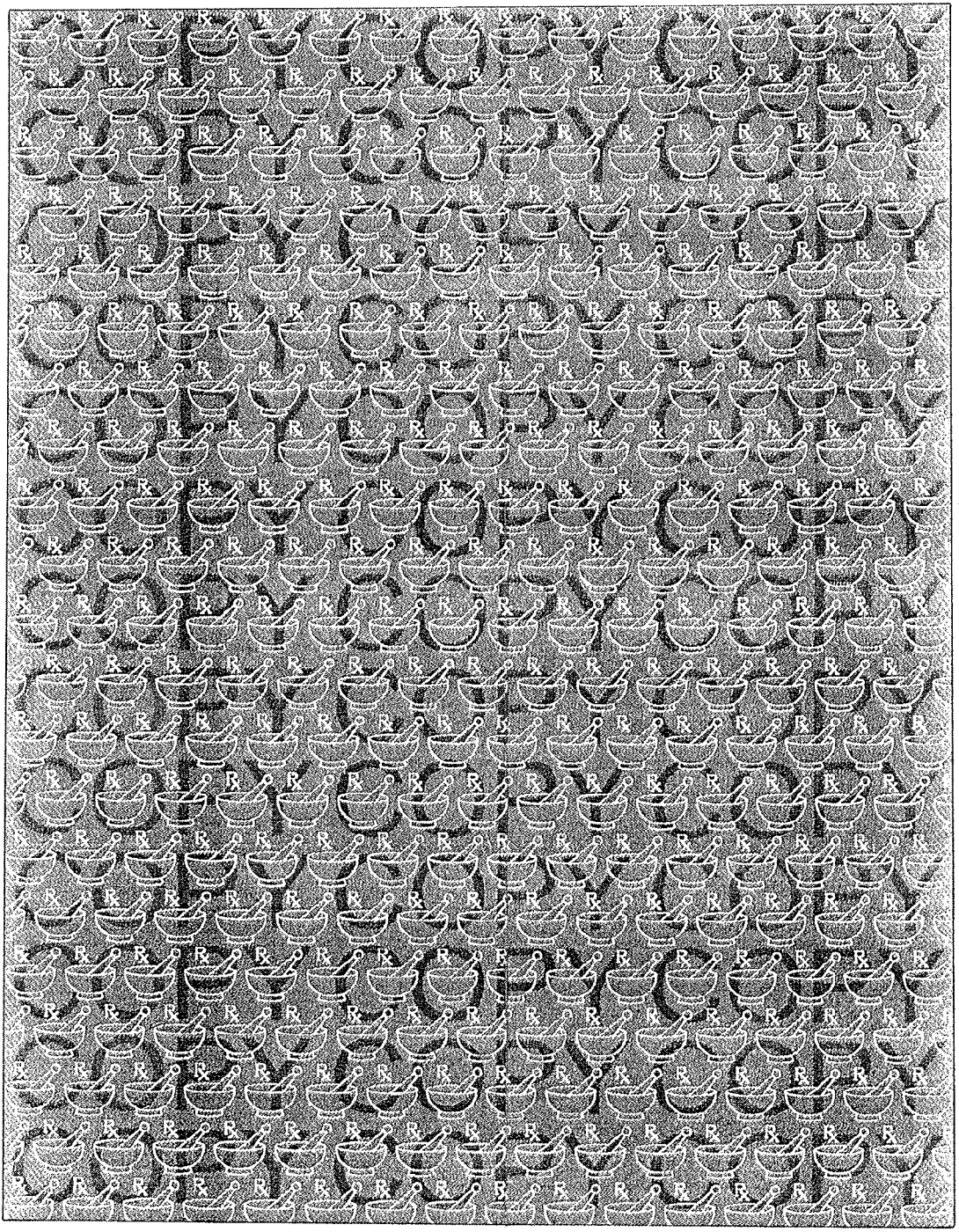
FIG. 12 is a graphical illustration of the void pantograph of FIG. 11, copied by the machine of interest.

When this void pantograph, with the interference overlay, is copied, as shown in FIG. 12, the pantograph message "copy" clearly shows up, indicating that this is not an original document.

What is claimed is:

1. A method of generating a number of different void pantographs, the method comprising:
   (1) generating a dot pattern for a pantograph foreground by selecting from multiple combinations of dot size and dot placement on an X-Y grid;
   (2) generating a dot pattern for a pantograph background by selecting from multiple combinations of dot size and dot placement on an X-Y grid, wherein at least one of generating the pantograph foreground or generating the pantograph background includes combining two different dot patterns selected from the multiple combinations of dot size and dot placement on the X-Y grid prior to the at least one of the foreground dot pattern or the background dot pattern being printed;
   (3) varying either the pantograph foreground dot pattern or background dot pattern by changing dot placement and/or dot size while maintaining the other pantograph pattern static;
   (4) combining the foreground and background pattern to generate a void pantograph; and
   repeating steps (1) to (4) a plurality of times to generate a plurality of different void pantographs.

2. The method of claim 1 further comprising:
   printing the plurality of different void pantographs;
   assessing visual blending of the foreground and background in the plurality of printed pantograph patterns;
   scanning the printed pantograph patterns using a selected copy machine; and
   assessing the degree that the foreground pantograph pattern stands out in the scanned copy.

3. The method of claim 1 wherein the at least one of generating the pantograph foreground or generating the pantograph background includes generating the pantograph foreground.

4. The method of claim 1 wherein the at least one of generating the pantograph foreground or generating the pantograph background includes generating the pantograph background.

5. The method of claim 4 wherein the at least one of generating the pantograph foreground or generating the pantograph background includes generating the pantograph foreground.

6. The method of claim 2 wherein the at least one of generating the pantograph foreground or generating the pantograph background includes generating the pantograph foreground.

7. The method of claim 2 wherein the at least one of generating the pantograph foreground or generating the pantograph background includes generating the pantograph background.

8. The method of claim 7 wherein the at least one of generating the pantograph foreground or generating the pantograph background includes generating the pantograph foreground.

9. The method of claim 1 further comprising:
   assessing the dot density of each of the generated void pantographs; and
   printing only the void pantographs having a similar dot density.

10. The method of claim 9 further comprising:
    assessing blending of the foreground and background in the plurality of printed pantograph patterns;
    scanning the printed pantograph patterns using a selected copy machine; and
    assessing the degree that the foreground pantograph pattern stands out in the scanned copy.

11. The method of claim 10 wherein the at least one of generating the pantograph foreground or generating the pantograph background includes generating the pantograph foreground.

12. The method of claim 10 wherein the at least one of generating the pantograph foreground or generating the pantograph background includes generating the pantograph round.

13. The method of claim 12 wherein the at least one of generating the pantograph foreground or generating the pantograph background includes generating the pantograph foreground.

14. The method of claim 1 wherein the selected dot size may vary in size between one and five pixels.

15. The method of claim 1 wherein the dot placement may vary from four to nine along the X axis and Y axis on an X-Y grid.

16. The method of claim 1 wherein the dot size for the pantograph foreground is static.

17. The method of claim 16 wherein the dot size for the pantograph background is static and the dot placement is varied.

18. The method of claim 1 wherein the dot size for the pantograph foreground is static and the dot size for the pantograph background is varied.

19. The method of claim 18 wherein the dot placement for the pantograph foreground and background is static.

20. The method of claim 19 wherein the at least one of generating the pantograph foreground or generating the pantograph background includes generating the pantograph foreground and generating the pantograph background.

* * * * *